(12) United States Patent
Ahmed

(10) Patent No.: US 8,438,152 B2
(45) Date of Patent: May 7, 2013

(54) TECHNIQUES FOR BUSHY TREE EXECUTION PLANS FOR SNOWSTORM SCHEMA

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 858 days.

(21) Appl. No.: 11/927,324

(22) Filed: Oct. 29, 2007

(65) Prior Publication Data

US 2009/0112793 A1    Apr. 30, 2009

(51) Int. Cl.
*G06F 7/00* (2006.01)
*G06F 17/30* (2006.01)

(52) U.S. Cl.
USPC .......................................................... 707/714

(58) Field of Classification Search .................. 707/714, 707/999.002
See application file for complete search history.

(56) References Cited

U.S. PATENT DOCUMENTS

| | | |
|---|---|---|
| 4,769,772 A | 9/1988 | Dwyer |
| 4,829,427 A | 5/1989 | Green |
| 5,091,852 A | 2/1992 | Tsuchida et al. |
| 5,325,525 A | 6/1994 | Shan et al. |
| 5,339,429 A | 8/1994 | Tanaka et al. |
| 5,412,804 A | 5/1995 | Krishna |
| 5,437,032 A | 7/1995 | Wolf et al. |
| 5,452,468 A | 9/1995 | Peterson |
| 5,495,419 A | 2/1996 | Rostoker et al. |
| 5,495,605 A | 2/1996 | Cadot |
| 5,495,606 A | 2/1996 | Borden et al. |
| 5,537,588 A | 7/1996 | Engelmann et al. |
| 5,548,755 A | 8/1996 | Leung et al. |
| 5,551,027 A | 8/1996 | Choy et al. |
| 5,574,900 A | 11/1996 | Huang et al. |
| 5,590,319 A | 12/1996 | Cohen et al. |
| 5,590,324 A | 12/1996 | Leung et al. |
| 5,642,515 A | 6/1997 | Jones et al. |
| 5,675,791 A | 10/1997 | Bhide et al. |
| 5,680,547 A | 10/1997 | Chang |
| 5,694,591 A * | 12/1997 | Du et al. ............................... 1/1 |
| 5,710,915 A | 1/1998 | McElhiney |
| 5,787,251 A | 7/1998 | Hamilton et al. |
| 5,797,136 A | 8/1998 | Boyer et al. |
| 5,822,748 A | 10/1998 | Cohen et al. |

(Continued)

OTHER PUBLICATIONS

Jonathan Lewis, "Oracle Scratchpad: Left-Deep Trees", Jan. 24, 2007, available online: http://jonathanlewis.wordpress.com/2007/01/24/left-deep-trees/.*

(Continued)

*Primary Examiner* — Brannon W Smith
(74) *Attorney, Agent, or Firm* — Hickman Palermo Truong Becker Bingham Wong LLP

(57) ABSTRACT

Methods for transforming a query to simulate a bushy tree execution plan for queries containing joins in series are provided. Left deep tree execution plans are supported by most relational database systems but are inefficient at processing queries directed to databases with snowstorm schema. A snowstorm schema contains several large fact tables and many smaller dimension tables, which make reference to one another. Bushy tree execution plans can be much more efficient for processing queries to snowstorm schema. The decision to choose between left-deep and bushy tree execution plans are based on the relative costs of the two execution plans. The methods provided transform queries which are otherwise executed with left deep tree execution plans into queries which are executed with simulated bushy tree execution plans.

14 Claims, 7 Drawing Sheets

U.S. PATENT DOCUMENTS

| | | | |
|---|---|---|---|
| 5,832,477 | A | 11/1998 | Bhargava et al. |
| 5,857,180 | A | 1/1999 | Hallmark et al. |
| 5,905,981 | A | 5/1999 | Lawler |
| 5,918,225 | A | 6/1999 | White et al. |
| 5,924,088 | A | 7/1999 | Jakobsson et al. |
| 5,963,932 | A | 10/1999 | Jakobsson et al. |
| 5,974,408 | A | 10/1999 | Cohen et al. |
| 6,009,265 | A | 12/1999 | Huang et al. |
| 6,026,394 | A | 2/2000 | Tsuchida et al. |
| 6,044,378 | A | 3/2000 | Gladney |
| 6,061,676 | A * | 5/2000 | Srivastava et al. ............ 1/1 |
| 6,289,334 | B1 | 9/2001 | Reiner et al. |
| 6,298,342 | B1 | 10/2001 | Graefe et al. |
| 6,339,768 | B1 | 1/2002 | Leung et al. |
| 6,370,524 | B1 | 4/2002 | Witkowski |
| 6,430,550 | B1 | 8/2002 | Leo et al. |
| 6,438,558 | B1 | 8/2002 | Stegelmann |
| 6,438,562 | B1 | 8/2002 | Gupta et al. |
| 6,510,422 | B1 | 1/2003 | Galindo-Legaria et al. |
| 6,529,896 | B1 | 3/2003 | Leung et al. |
| 6,529,901 | B1 | 3/2003 | Chaudhuri et al. |
| 6,535,874 | B2 | 3/2003 | Purcell |
| 6,622,138 | B1 | 9/2003 | Bellamkonda et al. |
| 6,684,203 | B1 | 1/2004 | Waddington et al. |
| 6,694,306 | B1 | 2/2004 | Nishizawa et al. |
| 6,792,420 | B2 | 9/2004 | Chen et al. |
| 6,801,905 | B2 | 10/2004 | Andrei |
| 6,901,405 | B1 | 5/2005 | McCrady et al. |
| 6,934,699 | B1 | 8/2005 | Haas et al. |
| 6,941,360 | B1 | 9/2005 | Srivastava et al. |
| 6,954,776 | B1 | 10/2005 | Cruanes et al. |
| 6,961,729 | B1 | 11/2005 | Toohey et al. |
| 6,980,988 | B1 | 12/2005 | Demers et al. |
| 6,990,503 | B1 | 1/2006 | Luo et al. |
| 7,031,956 | B1 | 4/2006 | Lee et al. |
| 7,072,896 | B2 | 7/2006 | Lee et al. |
| 7,089,225 | B2 | 8/2006 | Li et al. |
| 7,146,360 | B2 | 12/2006 | Allen et al. |
| 7,167,852 | B1 | 1/2007 | Ahmed et al. |
| 7,184,998 | B2 * | 2/2007 | Nica ............ 1/1 |
| 7,246,108 | B2 | 7/2007 | Ahmed |
| 7,321,888 | B2 * | 1/2008 | Day et al. ............ 1/1 |
| 7,440,935 | B2 | 10/2008 | Day et al. |
| 7,882,100 | B2 * | 2/2011 | Andrei ............ 707/714 |
| 7,925,646 | B2 * | 4/2011 | Gao et al. ............ 707/714 |
| 8,086,598 | B1 * | 12/2011 | Lamb et al. ............ 707/714 |
| 2001/0047372 | A1 | 11/2001 | Gorelik et al. |
| 2002/0038313 | A1 | 3/2002 | Klein et al. |
| 2002/0138376 | A1 | 9/2002 | Hinkle |
| 2003/0120825 | A1 | 6/2003 | Avvari et al. |
| 2003/0167258 | A1 | 9/2003 | Koo et al. |
| 2004/0068509 | A1 | 4/2004 | Garden et al. |
| 2004/0068696 | A1 | 4/2004 | Seyrat et al. |
| 2004/0143791 | A1 | 7/2004 | Ito et al. |
| 2004/0148278 | A1 | 7/2004 | Milo et al. |
| 2004/0167904 | A1 | 8/2004 | Wen et al. |
| 2004/0220911 | A1 | 11/2004 | Zuzarte et al. |
| 2004/0220923 | A1 | 11/2004 | Nica |
| 2004/0267760 | A1 | 12/2004 | Brundage et al. |
| 2004/0268305 | A1 | 12/2004 | Hogg et al. |
| 2005/0033730 | A1 | 2/2005 | Chaudhuri et al. |
| 2005/0055382 | A1 | 3/2005 | Ferrat et al. |
| 2005/0076018 | A1 | 4/2005 | Neidecker-Lutz |
| 2005/0149584 | A1 | 7/2005 | Bourbonnais et al. |
| 2005/0187917 | A1 | 8/2005 | Lawande et al. |
| 2005/0198013 | A1 | 9/2005 | Cunningham et al. |
| 2005/0210010 | A1 | 9/2005 | Larson et al. |
| 2005/0234965 | A1 | 10/2005 | Rozenshtein et al. |
| 2005/0278289 | A1 | 12/2005 | Gauweiler et al. |
| 2005/0278616 | A1 | 12/2005 | Eller |
| 2005/0283471 | A1 | 12/2005 | Ahmed |
| 2005/0289125 | A1 | 12/2005 | Liu et al. |
| 2006/0026115 | A1 | 2/2006 | Ahmed |
| 2006/0026133 | A1 | 2/2006 | Ahmed |
| 2006/0041537 | A1 | 2/2006 | Ahmed |
| 2006/0167865 | A1 | 7/2006 | Andrei |
| 2006/0168513 | A1 | 7/2006 | Coulson et al. |
| 2006/0200451 | A1 * | 9/2006 | Kosuru et al. ............ 707/3 |
| 2006/0282423 | A1 * | 12/2006 | Al-Omari et al. ............ 707/4 |
| 2007/0027880 | A1 | 2/2007 | Dettinger et al. |
| 2007/0044012 | A1 | 2/2007 | Suver et al. |
| 2007/0073643 | A1 | 3/2007 | Ghosh et al. |
| 2007/0078812 | A1 | 4/2007 | Waingold et al. |
| 2007/0179947 | A1 | 8/2007 | Ahmed et al. |
| 2007/0219951 | A1 | 9/2007 | Ahmed et al. |
| 2007/0219952 | A1 | 9/2007 | Ahmed et al. |
| 2007/0219969 | A1 | 9/2007 | Su et al. |
| 2007/0219977 | A1 | 9/2007 | Su et al. |
| 2008/0010240 | A1 | 1/2008 | Zait |
| 2008/0033914 | A1 * | 2/2008 | Cherniack et al. ............ 707/3 |
| 2008/0077606 | A1 | 3/2008 | Fang et al. |
| 2008/0120351 | A1 | 5/2008 | Khaladkar et al. |
| 2009/0055349 | A1 | 2/2009 | Ahmed |

OTHER PUBLICATIONS

Simon Stemplinger, "Evaluation of the Use of Static Analysis for Improving Database Schemes", Oct. 15, 2004.*

Jonathan Lewis, "Oracle Scratchpad: Web Presentation", Mar. 5, 2007, Slides are appended; available online: http://jonathanlewis.wordpress.com/2007/03/05/web-presentation/.*

Lu et al, "Optimization of Multi-Way Join Queries for Parallel Execution", 1991.*

Ioannidis et al, "Left-Deep vs. Bushy Trees: An Analysis of Strategy Spaces and Its implications for Query Optimization", 1991, ACM, pp. 168-177.*

Oracle, "Oracle 9i Database Documentation", Oracle, Parts A96670-01, A96674-01, A96673-02, 2002, 833 pages.

Fitzgerald et al., "Special Edition Using Crystal Reports IO", Que, Chapters 23, 24, 27, 35, Appendix A, Jul. 14, 2004, 170 pages.

Rankins et al., "Microsoft SQL Server 2000 Unleashed," Second Edition, Sams, Chapters 3, 4, 5, 6, 36, Dec. 18, 2002, 109 pages.

Bergsten, et al., "Prototyping DBS3 a Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14th VLDB Conference,1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13th VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Leverenz et al., "Oracle 8i Concepts Release 8.1.5-A67781-01", Oracle Corporation, Feb. 1999, located on the internet at <http://www.csee.umbc.edu/help/oracle8/server.815/a67781/toc.htm>, 122 pages.

Pirahesh, Hamid, et al., "Extensible/Rule Base Query Rewrite Optimization in Starburst", IBM Almaden Research Center, 1992.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14th VLDB Conference, 1988, pp. 318-330.

Tandem, "A Benchmark of NonStop SQL on the Debit Credit Transaction", The Tandem Performance Group, 1988, pp. 337-341.

George Lumpkin, Hakan Jakobsson, "Query Optimization in Oracle 9i", Oracle Corporation, Oracle White Paper, Feb. 2002, pp. 1-30.
Umeshwar Dayal, "Of Nests and Trees: A Unified Approach to Processing Queries That Contain Nested Subqueries, Aggregates and Quantifiers", Proceedings of the 13$^{th}$ VLDB Conference, Brighton 1987, pp. 197-208.
P. Griffiths Selinger, M.M. Astrahan, D.D. Chamberlin, R.A. Lorie, T.G. Price, "Access Path Selection in a Relational Database Management System", Proceedings of the 1979 ACM SIGMOD International Conference on the Management of Data, 1979, pp. 23-34.
Gail Erickson, author. Microsoft TechNet. Improving Performance with SQL Server 2000 Indexed Views. Microsoft Corp. Sep. 2000.
Cesar Galindo-Legaria & Arnon Rosenthal. Outerjoin Simplification and Reordering for Query Optimization. ACM 1997.
Praveen Seshadri et al. Cost-Based Optimization for Magic: Algebra and Implementation. SIGMOD Jun. '96. ACM 1996.
M. Muralikrishna. Improved Unnesting Algorithms for Join Aggregate SQL Queries. 18th VLDB Conference. Canada, 1992.
Rafi Ahmed et al., "Cost-Based Query Transformation in Oracle," Copyright 2006 VLDB, ACM 1595933859, pp. 1026-1036.
Alin Deutsch et al. Minimization and Group-by Detection for Nested Xqueries. University of California, San Diego. Pub. 2003.
Surajit Chaudhuri et al. Including Group-by in Query Optimization. Hewlett-Packard Laboratories. 20$^{th}$ VLDB Conference. Chile, 1994.
Priti Mishra et al. Join Processing in Relational Databases. ACM Computing Surveys. Mar. 1992.
Author: John Hayu. Analytic SQL Features in Oracle9i. An Oracle Technical White Paper. Dec. 2001.

Oracle 8i Tuning Release 8.1.5 A67775-01. Optimizer Modes, Plans Stablility, and Hints. Oracle Website. Copyright 1999.
Deutsch, Alin et al., "Minimization and Group-By Detection for Nested XQueries", University of California, San Diego, 2003, 15 pages.
Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.
Chaudhuri, Surajit, "An Overview of Query Optimization in Relational Systems", Microsoft Research, 1998, 10 pages.
Muralikrishna, M., "Improved Unnesting Algorithms for Join Aggregate SQL Queries", VLDB Conference, Canada, 1992, 12 pages.
Hayu, John, "Analytic SQL Features in Oracle9i", An Oracle Technical White Paper, Dec. 2001, 32 pages.
Oracle, "Optimizer Modes, Plans Stability, and Hints", Oracle8i Tuning Release 8.1.5 A67775-01, Oracle Website, 1999, 54 pages.
Chen, et al., "View merging in the context of view selection changing", Database Engineering and Applications Symposium 2002, Proceedings, Jul. 2002, 10 pages.
Li, C. et al., "Minimizing View Sets without Losing Query-Answering Power" 2001, Springer, pp. 99-113.
Mumick, I. et al., "Maintenance of Data Cubes and Summary Tables in a Warehouse", ACM 1997, pp. 100-111.
Rafi Ahmed, "Affidavit of Rafi Ahmed", dated Feb. 8, 2010, 3 pages.
Response to Office Action, U.S. Appl. No. 11/237,040, submitted Feb. 10, 2010, 20 pages.

* cited by examiner

TECHNIQUES FOR BUSHY TREE EXECUTION PLANS FOR SNOWSTORM SCHEMA

FIELD OF THE INVENTION

The present invention relates to database systems and, in particular, to generating execution plans for processing queries to a database system.

BACKGROUND

Relational and object-relational database management systems store information in tables of rows in a database. To retrieve data, queries that request data are submitted to a database server, which computes the queries and returns the data requested.

Queries submitted to the database server must conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that describes operations for executing the query. The optimized execution plan may be based on a rewrite of the query.

A common type of query that is optimized is a query that contains a series of joins where a table referenced in one join is also referenced in the following join. One common technique for generating an execution plan for this type of query is to generate a left deep tree execution plan. In a left deep tree execution plan, the result of one join operation is used as the left input to the next join with another table.

Although the left deep tree execution plan is commonly supported by relational database systems and is effective for many types of serial joins, it is an inefficient technique for databases with snowstorm schema, which contains many large fact tables and many small dimension tables, where fact and dimension tables reference one another. Therefore, it is desirable to develop techniques for generating execution plans for efficiently performing serial joins that specify tables in a database with snowstorm schema.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 depicts an example of a series of joins involving large fact tables and small dimension tables.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Left deep trees and bushy trees are two possible execution plans generated for performing queries specifying a series of joins where a table referenced in one join is also referenced in the next join. Left deep tree execution plans, however, are inefficient for queries posed against snowstorm schema, a schema that contains several large fact tables and many dimension tables, which are all interconnected.

Bushy tree execution plans are much more efficient than left deep tree execution plans for processing queries to snowstorm schema because in a bushy tree execution plan, the large fact tables are first joined with small dimension tables to produce a set of reduced-size intermediate results.

A relational database system may not support bushy tree execution plans. Therefore, according to one technique, bushy tree execution plans are simulated on database systems supporting left deep tree execution plans by enclosing joins between large fact tables and small dimension tables inside unmergeable inline views.

Left Deep Trees and Bushy Trees

One common technique for performing several joins in series is to use a left deep tree execution plan. Consider the following query Q1.

```
Q1 =   SELECT T4.f
       FROM T1, T2, T3, T4
       WHERE      T1.a = T2.b AND
                  T2.c = T3.d AND
                  T3.e = T4.f
```

Query Q1 specifies three joins in series involving tables T1 and T2 in a first join, tables T2 and T3 in a second join, and tables T3 and T4 in a third join. A left deep tree execution plan generated for Q1 is illustrated in FIG. 1.

Figure 1:
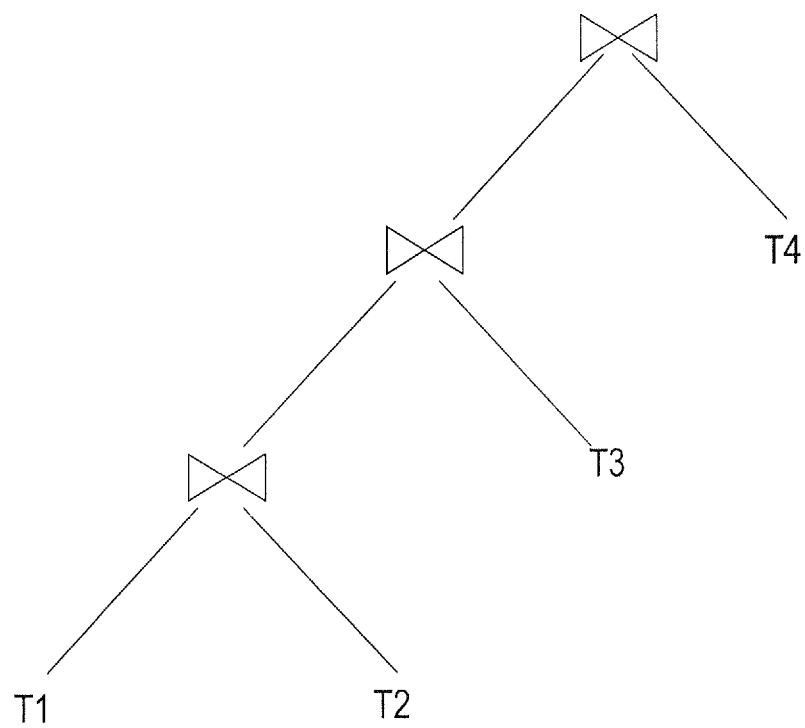
FIG. 1 depicts an example of a left deep tree execution plan.

As illustrated in FIG. 1, a left deep tree execution plan generated for Q1 involves the following steps. First, tables T1 and T2 are joined together (in FIG. 1 and other figures, the ⋈ symbol specifies a join). Next, the results from the join between T1 and T2 are joined with table T3. Finally, the results from the join between the results from the join between T1 and T2 and table T3 are joined with table T4. Although there are only four tables and three joins in the series of joins in this example, the left deep tree execution plan can be extended to apply to a query that specifies any number of joins in series.

Figure 2:
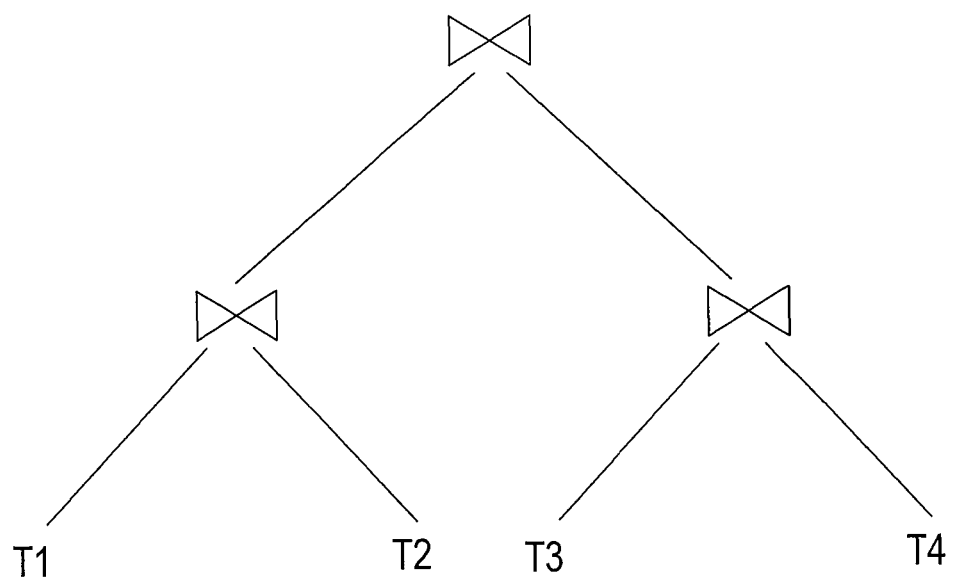
FIG. 2 depicts an example of a bushy tree execution plan.

An alternative technique for performing several joins in series is to use a bushy tree execution plan. Consider query Q1 specified above. A bushy tree execution plan generated for Q1 is illustrated in FIG. 2. As illustrated in FIG. 2, a bush-tree execution plan generated for Q1 involves joining tables T1 and T2, and tables T3 and T4, separately. These joins may be performed in parallel or in serial. Then, the intermediate results from the two joins are joined together to produce the results for Q1. The bushy tree execution plan can also be extended to apply to a query that specifies any number of joins with multiple fact tables and their associated dimension tables.

Snowstorm Schema

One type of database schema is referred to as a snowstorm schema. The primary characteristic of a snowstorm schema is that it contains several large fact tables and many dimension tables, which may make references to one another. The dimension tables are much smaller than the fact tables. Furthermore, the fact tables and the dimension tables have references to one another. In other words, a large fact table may be associated with one or more small dimension tables and other fact tables. Similarly, dimension tables may reference other dimension tables.

Whether tables in a database are part of a snowstorm schema may be determined by examining the relative sizes of the tables and join references in the given query. For example, if there are several tables whose size is above a certain threshold and many tables whose size is below a certain threshold and there are one or more star- or snowflake-type joins, then it may be determined that these are fact tables and dimension tables, and therefore part of a snowstorm schema. The specific size thresholds used for detecting a snowstorm schema may vary from case to case. Detailed discussion of snowstorm schema are included in Othayoth, R. and Poess, M., "The Making of TPC-DS", Proceedings of the 32nd International Conference on Very Large Data Bases, pp. 1049-1058, 2006.

Joins in a Snowstorm Schema Using Left Deep Trees

Queries against snowstorm schema that specify a series of joins may be processed through generating a left deep tree execution plan. Consider query Q2. Q2 is very similar to query Q1 that is discussed above. Q2, however, is directed against a snowstorm schema and therefore involves fact tables and dimension tables.

```
Q2 =   SELECT F1.K, F2.f
       FROM F1, D1, D3, F2, D2, D4
       WHERE       F1.a = D1.b AND F1.b = D3.h AND
                   F1.c = F2.d AND F2.e = D2.f AND
                   F2.g = D4.s;
```

Figure 3:
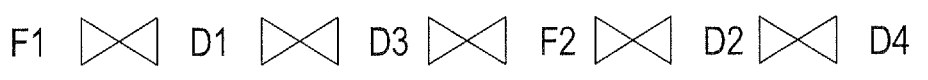

Query Q2 specifies five joins: two joins between a fact table F1 and its associated dimension tables D1 and D3, one join between two fact tables F1 and F2, and two joins between fact table F2 and its associated dimension tables D2 and D4. FIG. 3 illustrates the joins specified in query Q2.

Figure 4:
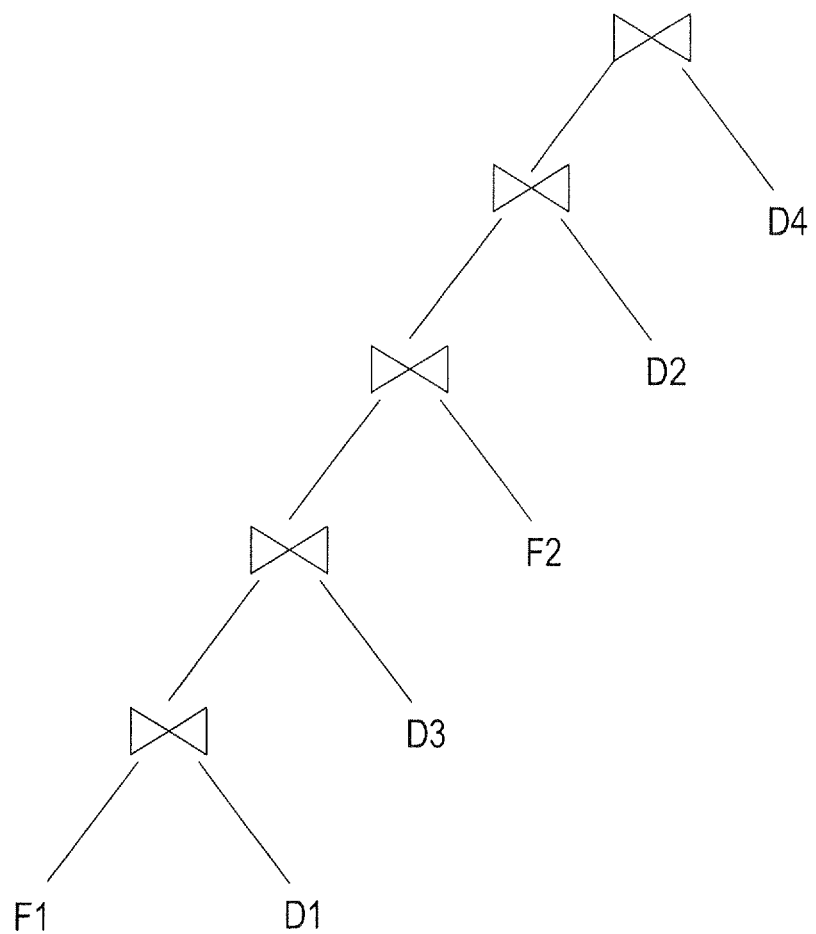
FIG. 4 depicts an example of a left deep tree execution involving large fact tables and small dimension tables.

A left deep tree execution plan generated for Q2 is illustrated in FIG. 4. As illustrated in FIG. 4, a left deep tree execution plan generated for Q2 involves the following steps. First, tables F1 and D1 are joined together. Next, the results from the join between F1 and D1 are joined with table D3. Next the result is joined with F2. In the next step, the result is joined with D2. Finally, the results from the previous join is joined with table D4.

Joins are expensive operations for a database to perform. The larger the tables involved in a particular join, the more expensive and less efficient the particular join. The join between tables F1 and D1 in FIG. 4 is efficient because D1 is a small table. By joining a small table like D1 to a large table like F1, the results of the join are much smaller than the original table F1. Therefore, the join results of F1 and D1 is a manageable size for joining with other tables or join results. However, the join between the join results of F1, D1 and D3 and D1 and table F2 is not an efficient join because F2 is a large fact table that has not yet been reduced to a manageable size by first joining with a small dimension tables like D2 or D4. Therefore, left deep tree execution plans, such as the one in FIG. 4, are inefficient for queries to snowstorm schema, such as query Q2. Further, in many scenarios there may be more than two fact tables with its associated dimension tables, and therefore the inefficiency alluded to here may also multiply.

Joins in a Snowstorm Schema Using Bushy Trees

Figure 5:
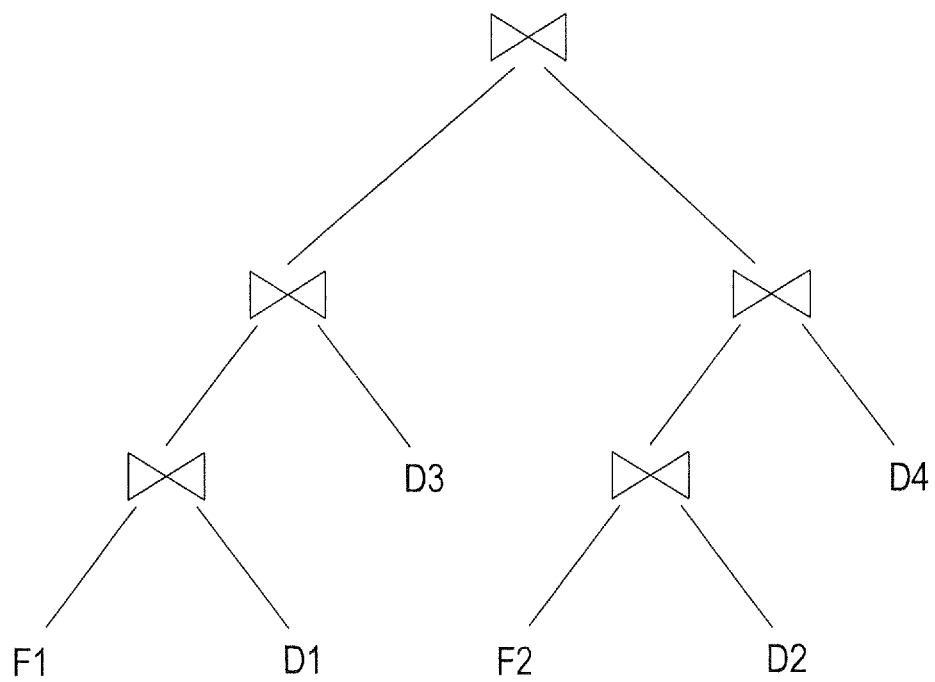
FIG. 5 depicts an example of a bushy tree execution involving large fact tables and small dimension tables.

Alternatively, a bushy tree execution plan may be used to perform the query Q2 discussed above. A bushy tree execution plan generated for Q2 is illustrated in FIG. 5. As illustrated in FIG. 5, a bushy tree execution plan generated for Q2 involves joining tables F1 with D1 and D3, and tables F2 with D2 and D4, separately. These joins may be performed in parallel or in serial. Then, the results from the two joins are joined together to produce the results for Q2.

As FIG. 5 illustrates, F2 is not joined with the join results of F1, D3 and D1, as in FIG. 4, but rather, it is joined first with the associated dimension tables D2 and D4. Because D2 and D4 are much smaller tables than F2 and they filter out significant number of rows from F1, the join results of F2, D4 and D2 is of a manageable size. Therefore, the final join between the join result of F1, D3 and D1 and the join result of F2, D4 and D2 is a relatively far less expensive join. In sum, the bushy tree execution plan can be more efficient than the left deep tree execution for performing joins in a snowstorm schema.

The decision to choose between left-deep and bushy tree execution plans is made on the basis of the costs of the two execution plans. Cost-based transformations may be performed on the left-deep and bushy tree execution plans before a final choice between the two plans is made. In a cost-based transformation, logical and physical optimizations are combined to generate an optimal execution plan. Detailed discussion of a cost-based transformation framework and descriptions of various types of cost-based transformations, such as subquery unnesting and join predicate pushdown, are included in Ahmed, R., et al, "Cost-Based Transformation in Oracle", Proceedings of the 32nd International Conference on Very Large Data Bases, pp. 1026-1036, 2006.

Simulating a Bushy Tree Execution Plan in a Database Supporting Left Deep Trees

If a relational database system only supports left deep tree execution plans and does not support bushy tree execution plans, then, according to one embodiment, a bushy tree execution plan is simulated through the use of unmergeable, inline views. An unmergeable view is a view that a query optimizer or compiler determines should or cannot be merged because certain conditions or criteria are not satisfied. Consider again query Q2 discussed above. In a database system that only supports left deep trees, an execution plan like the one in FIG. 4 is automatically generated for query Q2. However, an execution plan like the one in FIG. 5, which utilizes a bushy tree, is preferred and desired for joins in a snowstorm schema. To induce a database system to generate what is effectively a bushy tree execution plan, query Q2 may be transformed into query Q3 as follows.

```
Q3 =  SELECT D2.f
      FROM    (SELECT /*+ NO_MERGE */ *
               FROM F1, D1, D3
               WHERE F1.a = D1.b AND F1.b = D3.h) V1
              (SELECT /*+ NO_MERGE */ *
               FROM F2, D2
               WHERE F2.c = D2.d AND F2.e = D4.f) V2
      WHERE   V1.c = V2.d
```

Figure 6:
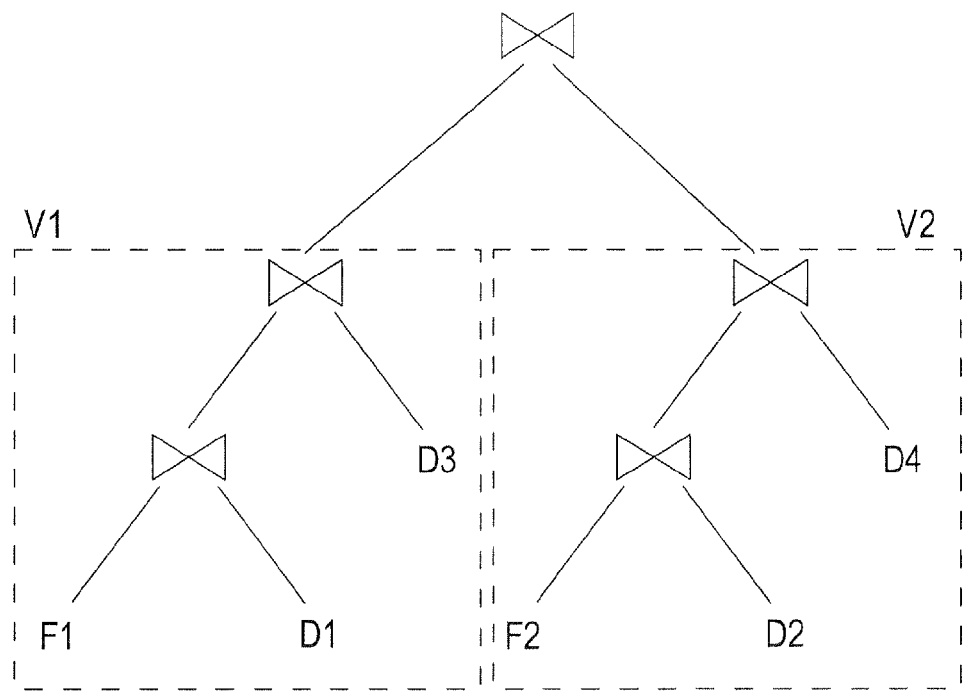
FIG. 6 depicts an example of a simulated bushy tree execution involving large fact tables and small dimension tables.

FIG. 6 illustrates the simulated bushy tree that is generated for query Q3. As FIG. 6 illustrates, F2, D4 and D2 are now part of unmergeable view V2. Therefore, F2 is joined with D2 and D4 before being joined with another table or another set of join results. F1, D3 and D1 are also part of unmergeable view V1. Although it is not necessary to enclose F1, D3 and D1 in an unmergeable view V1 in FIG. 6 because F1 is the leftmost input to the tree, a query optimizer may also select another table as the leftmost input. Therefore, enclosing F1, D3 and D1 in an unmergeable view ensures that a simulated bushy tree execution plan is generated.

In the example just discussed, a compiler directive /*+NO_MERGE */ is used to make a view unmergeable, because we are showing manually re-written queries as an illustration. The database system will internally mark such views as unmergeable. The present invention is not limited, however, to any particular way for making a view unmergeable.

Hardware Overview

Figure 7:
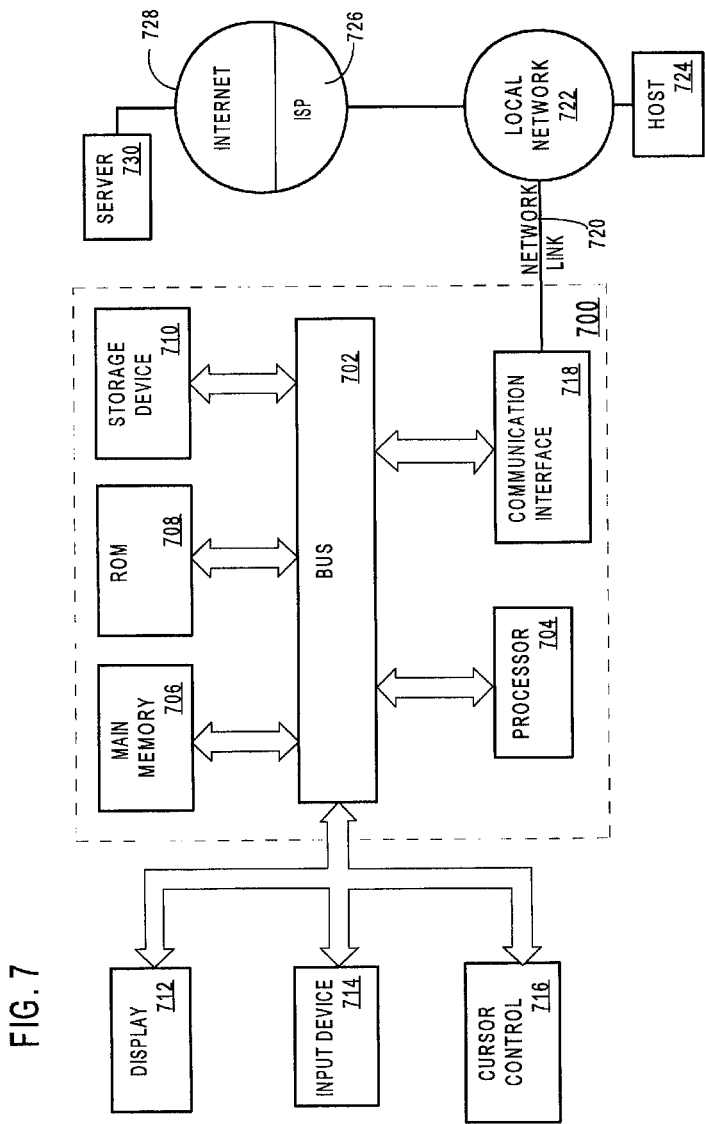
FIG. 7 depicts a computer system which may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising steps of:
   in response to determining that a particular query refers to one or more fact tables and one or more dimension tables, generating a transformed query based on the particular query to force a bushy tree execution to compute the results for the particular query;
   wherein the particular query specifies at least three join predicates;
   wherein the at least three join predicates include a first join predicate, a second join predicate, and a third join predicate;
   wherein a table referenced in the first join predicate is also referenced in the second join predicate;
   wherein a table referenced in the second join predicate is also referenced in the third join predicate;
   wherein generating the transformed query includes:
      enclosing, in an unmergeable view, a join operation based on the third join predicate;
      modifying the second join predicate to reference the unmergeable view;
   determining a first execution cost of the transformed query, wherein determining the first execution cost includes generating and evaluating at least one execution plan for computing the transformed query;
   determining a second execution cost of at least one version of the particular query, said version of the particular query being either (1) the particular query or (2) another transformed query based on the particular query, wherein determining the second execution cost includes generating and evaluating at least one execution plan of said at least one version of the particular query;
   performing a comparison of the first execution cost of the transformed query and the second execution cost of said at least one version of the particular query;
   based on the comparison, selecting the transformed query as an optimized version of the particular query; and
   wherein the steps are performed by one or more computing devices in response to executing the code of a query optimizer.

2. The computer-implemented method of claim 1, wherein the step of generating the transformed query is performed in response to determining that a particular set of criteria are met.

3. The computer-implemented method of claim 2, wherein the particular set of criteria includes:
   a table referenced in the first join predicate is bigger than a first threshold size,
   a table referenced in the first join predicate is smaller than a second threshold size,
   a table referenced in the third join predicate is bigger than the first threshold size, and
   a table referenced in the third join predicate is smaller than the second threshold size.

4. The computer-implemented method of claim 2, wherein the particular set of criteria includes:
   joins referenced in the particular query forming a particular configuration.

5. The computer-implemented method of claim 4, wherein the particular configuration includes a join between a fact table and a plurality of dimension tables.

6. The computer-implemented method of claim 4, wherein the particular configuration includes:
   (1) a plurality of fact tables;
   (2) at least one join between a fact table in the plurality of fact tables and a plurality of dimension tables; and
   (3) at least one join between a first fact table in the plurality of fact tables and a second fact table in the plurality of fact tables.

7. The computer-implemented method of claim 1, wherein the step of generating the transformed query further includes:
   enclosing, in a second unmergeable view, a join operation based on the third join predicate; and
   modifying the second join predicate to reference the second unmergeable view.

8. A non-transitory computer-readable storage medium storing instructions, wherein the instructions include instructions which, when executed by one or more processors, cause the one or more processors to perform steps comprising:
   in response to determining that a particular query refers to one or more fact tables and one or more dimension tables, generating a transformed query based on a particular query to force a bushy tree execution to compute the results for the particular query;
   wherein the particular query specifies at least three join predicates;
   wherein the at least three join predicates include a first join predicate, a second join predicate, and a third join predicate;
   wherein a table referenced in the first join predicate is also referenced in the second join predicate;

wherein a table referenced in the second join predicate is also referenced in the third join predicate;
wherein generating the transformed query includes:
 enclosing, in an unmergeable view, a join operation based on the third join predicate;
 modifying the second join predicate to reference the unmergeable view;
determining a first execution cost of the transformed query, wherein determining the first execution cost includes generating and evaluating at least one execution plan for computing the transformed query;
determining a second execution cost of at least one version of the particular query, said version of the particular query being either (1) the particular query or (2) another transformed query based on the particular query, wherein determining the second execution cost includes generating and evaluating at least one execution plan of said at least one version of the particular query;
performing a comparison of the first execution cost of the transformed query and the second execution cost of said at least one version of the particular query;
based on the comparison, selecting the transformed query as an optimized version of the particular query; and
wherein the steps are performed by one or more computing devices in response to executing the code of a query optimizer.

9. The computer-readable storage medium of claim 8, wherein the step of generating the transformed query is performed in response to determining that a particular set of criteria are met.

10. The computer-readable storage medium of claim 9, wherein the particular set of criteria includes:
 a table referenced in the first join predicate is bigger than a first threshold size,
 a table referenced in the first join predicate is smaller than a second threshold size,
 a table referenced in the third join predicate is bigger than the first threshold size, and
 a table referenced in the third join predicate is smaller than the second threshold size.

11. The computer-readable storage medium of claim 9, wherein the particular set of criteria includes:
 joins referenced in the particular query forming a particular configuration.

12. The computer-readable storage medium of claim 11, wherein the particular configuration includes a join between a fact table and a plurality of dimension tables.

13. The computer-readable storage medium of claim 11, wherein the particular configuration includes:
 (1) a plurality of fact tables;
 (2) at least one join between a fact table in the plurality of fact tables and a plurality of dimension tables; and
 (3) at least one join between a first fact table in the plurality of fact tables and a second fact table in the plurality of fact tables.

14. The computer-readable storage medium of claim 8, wherein the step of generating the transformed query further includes:
 enclosing, in a second unmergeable view, a join operation based on the third join predicate; and
 modifying the second join predicate to reference the second unmergeable view.

* * * * *

UNITED STATES PATENT AND TRADEMARK OFFICE
CERTIFICATE OF CORRECTION

PATENT NO. : 8,438,152 B2  
APPLICATION NO. : 11/927324  
DATED : May 7, 2013  
INVENTOR(S) : Ahmed Page 1 of 1

It is certified that error appears in the above-identified patent and that said Letters Patent is hereby corrected as shown below:

On Title page 3, in column 2, under "Other Publications", line 2, Delete "Stablility," and insert -- Stability, --, therefor.

In the Claims:

In column 7, line 49, in Claim 1, before "results" delete "the".

In column 8, line 15, in Claim 1, before "code" delete "the".

In column 8, line 60, in Claim 8, before "results" delete "the".

In column 9, line 25, in Claim 8, before "code" delete "the".

Signed and Sealed this  
Twenty-fourth Day of September, 2013

Teresa Stanek Rea  
*Deputy Director of the United States Patent and Trademark Office*